(12) United States Patent
Parsons et al.

(10) Patent No.: US 11,972,237 B1
(45) Date of Patent: Apr. 30, 2024

(54) MEMBER INVOCATION DECLARATIVE INTERCEPTION

(71) Applicant: Microsoft Technology Licensing, LLC, Redmond, WA (US)

(72) Inventors: Jared Parsons, Kirkland, WA (US); David Fowler, Kirkland, WA (US); Jan Kotas, Redmond, WA (US); Stephen Harris Toub, Winchester, MA (US); Richard Steele Gibson, Gig Harbor, WA (US); Andrew Spenser Gocke, Seattle, WA (US); Julien David Couvreur, Kirkland, WA (US); Christopher Sienkiewicz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/094,670

(22) Filed: Jan. 9, 2023

(51) Int. Cl.
*G06F 8/41* (2018.01)
*G06F 9/448* (2018.01)

(52) U.S. Cl.
CPC ............... *G06F 8/44* (2013.01); *G06F 9/449* (2018.02)

(58) Field of Classification Search
CPC ..... G06F 8/40; G06F 8/41; G06F 8/44; G06F 9/449
USPC ................................................. 717/136, 140
See application file for complete search history.

(56) References Cited

U.S. PATENT DOCUMENTS

| | | | |
|---|---|---|---|
| 10,747,510 B1* | 8/2020 | Lundeen | G06F 8/44 |
| 2009/0049421 A1* | 2/2009 | Meijer | G06F 9/4486 717/100 |
| 2012/0304160 A1* | 11/2012 | Soeder | G06F 9/4486 717/148 |
| 2021/0133066 A1* | 5/2021 | He | G06F 11/3466 |

OTHER PUBLICATIONS

"Aspect-oriented programming", retrieved from << https://en.wikipedia.org/wiki/Aspect-oriented_programming >>, Oct. 19, 2022, 18 pages.

(Continued)

*Primary Examiner* — Geoffrey R St Leger
(74) *Attorney, Agent, or Firm* — Ogilvie Law Firm

(57) ABSTRACT

Improved compilers recognize interception declarations in source code, and emit code that replaces invocations of specified artifacts with invocations of specified interceptors instead. Source generators proactively modify program behavior in arbitrary desired ways without introducing hidden security violations and without requiring edits by the program's developers. Interception declarations are visible in source code and development tools. In some cases, different invocations of a particular method at respective locations are intercepted by different replacement methods. Replacement methods have identical signatures, or are otherwise compatible. Some interceptors specify optional parameters. Method calls, field accesses, and property calls may be intercepted. Work to modify program behavior is moved in the program lifecycle from runtime to compile time, thus improving runtime performance and eliminating JIT compilation security risks.

20 Claims, 3 Drawing Sheets

---

ENHANCED SYSTEM 102, 202 WITH
MEMBER INVOCATION DECLARATIVE INTERCEPTION FUNCTIONALITY 204

MEMORY/MEDIA 112, 114

COMPILER 122 TO RECOGNIZE INTERCEPTION DECLARATION OF ARTIFACT-TO-INTERCEPT 304 AND REPLACE NON-INTERCEPTED INVOCATION 306 WITH INTERCEPTOR INVOCATION 308

EXECUTABLE PROGRAM 310 | INTERCEPTION LOCATION 312 IDENTIFIER 314 | OPTIONAL ARG 316 | INTERCEPTION LIST 318

PROCESSOR 110 | (NON)VIRTUAL METHOD (320) 322 | INTERFACE(S) 324

(56) References Cited

OTHER PUBLICATIONS

David Fowl, "asp.net Core and Trimming/NativeAOT", retrieved from << https://gist.github.com/davidfowl/64e0dba8fc3a3b68f068d97af95ae865#mvp-of-source-generated-minimal-apis >>, Oct. 1, 2022, 13 pages.
Phillip Carter, "Introducing C# Source Generators", retrieved from << https://devblogs.microsoft.com/dotnet/introducing-c-source-generators/#can-i-modify-rewrite-existing-code-with-a-source-generator >>, Apr. 29, 2020, 14 pages.
"Macro (computer science)", retrieved from << https://en.wikipedia.org/wiki/Macro_(computer_science) >>, Dec. 18, 2022, 10 pages.
"C Sharp (programming language)", retrieved from << https://en.wikipedia.org/wiki/C_Sharp_(programming_language)#Metaprogramming >>, Dec. 8, 2022, 23 pages.
"Metaprogramming", retrieved from << https://en.wikipedia.org/wiki/Metaprogramming >>, Dec. 10, 2022, 7 pages.
"Type.InvokeMember Method", retrieved from << https://learn.microsoft.com/en-us/dotnet/api/system.type.invokemember?view=net-7.0 >>, no later than Dec. 30, 2022, 25 pages.
"CallerArgumentExpression", retrieved from << https://learn.microsoft.com/en-us/dotnet/csharp/language-reference/proposals/csharp-10.0/caller-argument-expression>>, May 3, 2022, 8 pages.

* cited by examiner

SOME ADDITIONAL ASPECTS OF INVOCATION INTERCEPTION 212

| COMPATIBLE EXPRESSION 402 | METHOD 404 | EDIT 406 | CALL SITE 408 |
| VARIABLE 410: NAME 412, TYPE 414 | SIGNATURE 416 | ATTRIBUTE 418 |
| INTERCEPTOR REFERENCE 220 | FIELD 422 | DATA STRUCTURE 424 |
| OBJECT 426: PROPERTY 428, MEMBER 208 | SUBROUTINE 430 | CALL 448 |
| ADDRESS 432: BASE 434, OFFSET 436 | SOURCE GENERATOR 438 |
| DEBUGGING 440 SESSION 442 | LIBRARY 446 | INVOCATION STATEMENT 444 |
| ACCESS 450 STATEMENT 452 | FILE 456 | ARGUMENT VALUE 454 |

MEMBER INVOCATION DECLARATIVE INTERCEPTION

BACKGROUND

Noon Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers interact with source code editors, compilers, debuggers, profilers and various other software development tools as they develop software, with widespread beneficial effects.

Although many advances have been made, improvements in the computer technologies which are utilized for software development or for software execution remain possible, and are worth pursuing.

SUMMARY

Some embodiments described herein address technical challenges of computer technology, and more particularly technical challenges arising in the pursuit of improved software runtime performance and in the pursuit of secure yet powerful functionality to modify software behavior.

Some embodiments described herein include an enhanced compiler which recognizes a declaration of an interception of a member invocation, and then implements the interception by emitting suitable instructions. The declaration occurs in a source code of a program, and specifies both an interceptor and an artifact-to-intercept. The implementation includes the interceptor or a reference to the interceptor, and specifies one or more invocations to be intercepted such that the interceptor is invoked in place of the artifact-to-intercept when the compiled program runs. A benefit of such enhancement is improved software runtime performance by moving invocation changes from runtime to compile time. Because the interception is declared in source code that is inspectable at compile time, another benefit is that the enhancement provides a secure yet powerful functionality to modify software behavior.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
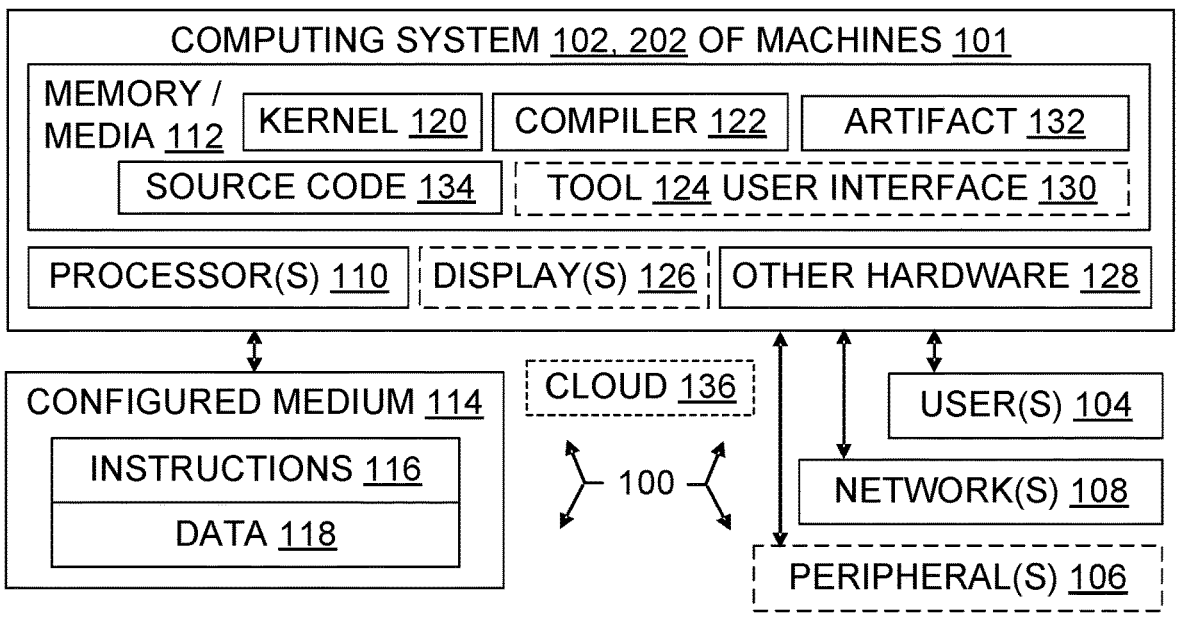
FIG. 1 is a diagram illustrating aspects of computer systems and also illustrating configured storage media, including some aspects generally suitable for systems which provide member invocation declarative interception functionality.

Innovations may expand beyond their origins, but understanding an innovation's origins can help one more fully appreciate the innovation. In the present case, some teachings described herein were motivated by technical challenges faced by Microsoft innovators who were working to improve technology for replacing method calls in programs.

The innovators observed that some technologies for replacing method calls of a program operated at runtime and were external to the program itself. Some technologies used an external program to manipulate an existing computational process at runtime to replace method calls; some involve rewriting a program's intermediate language after compilation prior to runtime. Moreover, some technologies relied on a developer of the program to change the program's source code in order to change a method call invocation. The innovators also observed that familiar source generators could add source code to a program at compile time, but these source generators did not change existing source code or change existing method invocations of the program.

The innovators hypothesized that a compiler could be enhanced to recognize in source code a declaration of a change to a method invocation, without requiring the developer who wrote the original invocation to modify the program's source code themself. This would have several benefits. One benefit is freeing developers from work otherwise required to allow changes in method call invocation—the changes could be performed proactively and automatically by suitably enhanced source code generators and compilers. Another benefit is improved cybersecurity due to the presence of declarations in source code instead of making less-well documented and difficult-to-detect invocation changes at runtime. Indeed, the declared interceptions are inspectable by enhanced development tools, e.g., an enhanced tool could highlight in a different color methods being intercepted, or hovering over a method call with a cursor could pop-up the actual target of the invocation. A third benefit is improved runtime performance, by moving invocation changes and associated performance costs to compile time instead of runtime.

Thus, the innovators faced the technical challenge of how to specify the invocation changes in source code. This challenge includes some constituent challenges, such as determining which invocations to intercept and which invocations not to intercept and why, and determining how to minimize the impact of invocation changes on compiler performance.

Some embodiments utilize or provide a compiler which performs a compilation of a source code containing a declaration of an interception by an interceptor of an artifact-to-intercept. The compiler emits an instruction (i.e., one or more instructions) implementing an invocation change from a non-intercepted invocation of the artifact-to-intercept to an invocation of the interceptor. This has the technical benefit of documenting the invocation change in source code, which enhances code understandability, code maintainability, and code security. This also has the technical benefit of improving runtime performance by moving the invocation change to compile-time instead of runtime, e.g., by setting up the invocation change one time when the program is compiled instead of each time the program runs.

Some embodiments gather a list of interceptions prior to emitting instructions which implement the listed interceptions. This has the technical benefit of reducing interception's impact on compiler performance, e.g., by precomputing a list of intercepted methods, the compiler avoids performing an extra pass through the generated source code to check for interception each time a method call is reached during compilation.

Some embodiments intercept a method's call site at a first call site location, and avoid intercepting a second call site of the method at a second call site location, thereby limiting interception of the method based on the method call site location(s) specified by interception declaration(s). This has the technical benefit of increasing interception flexibility by allowing specific calls to a method to be intercepted instead of forcing the interception of every call to the method.

In some embodiments, the artifact-to-intercept includes at least one of the following: a method, a field of a data structure, a property of an object, or a member of an object. This has the technical benefit of increasing interception flexibility by allowing interception of more than method calls and by allowing the interceptor and the artifact-to-intercept to be different kinds of members. For example, an interception result in some embodiments is that a read to a field A is intercepted by a method call. That is, instead of reading field A, a method B is called, and then the return value from the method B call is used during program execution in place of the content of field A.

In some scenarios, embodiments provide functionality for performing aspect-oriented programming, such as injecting pre/post code for tracing, logging, or diagnostics. Some embodiments provide a secure yet powerful functionality to modify software behavior while still allowing dynamic creation of an interceptor, e.g., by a source generator plugged into a compiler. In some embodiments and some scenarios, an interceptor is created directly by a developer, while in other scenarios an interceptor is generated by a tool which has the same inspection access as a compiler.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 130 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 130 supports interaction between an embodiment and one or more human users. In some embodiments, the user interface 130 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 124 include security tools or software apps, on mobile devices 102 or workstations 102 or servers 102, compilers 122 and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, member invocation declarative interception functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, processes, systems, functionalities, mechanisms, data structures, resources, interception or other algorithm implementations, or other items in a computing environment, which are disclosed herein but not associated with a particular reference numeral herein. Corresponding drawings may also be added.

More about Systems

Figure 2:
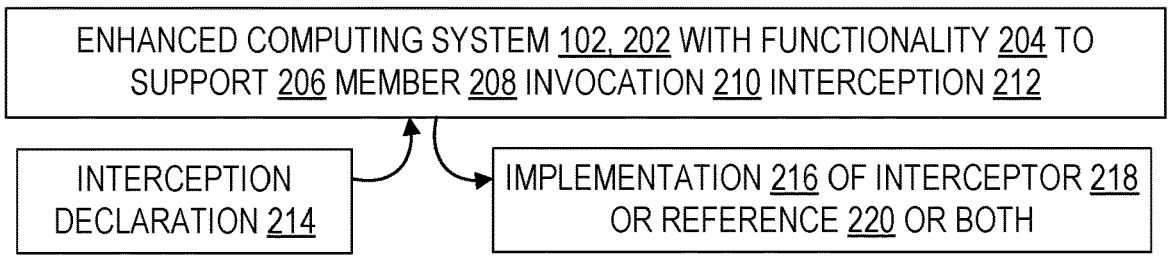
FIG. 2 is a block diagram illustrating an enhanced system configured with a member invocation declarative interception functionality.

FIG. 2 illustrates a computing system 102 configured by one or more of the member invocation declarative interception enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
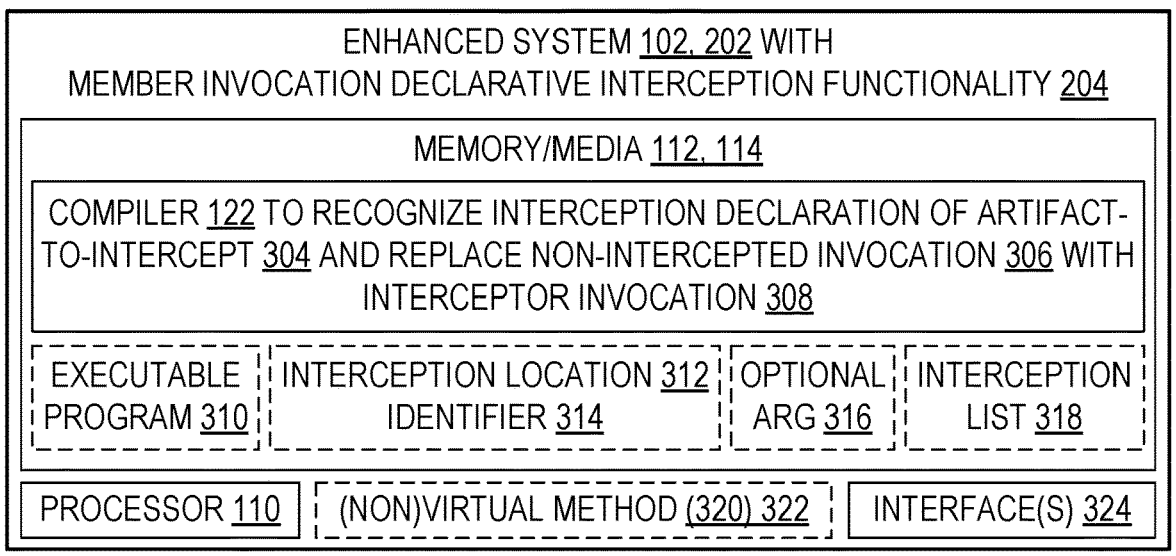
FIG. 3 is a block diagram illustrating aspects of a system enhanced with various aspects of member invocation declarative interception functionality.

FIG. 3 shows some aspects of some enhanced systems 202. This is not a comprehensive summary of all aspects of enhanced systems 202 or all aspects of member invocation declarative interception functionality 204. Nor is it a comprehensive summary of all aspects of an environment 100 or system 202 or other context of an enhanced system 202, or a comprehensive summary of all member invocation declarative interception mechanisms 204 for potential use in or with a system 102. FIG. 3 items are discussed at various points herein, and additional details regarding them are provided in the discussion of a List of Reference Numerals later in this disclosure document.

Figures 4, 5:
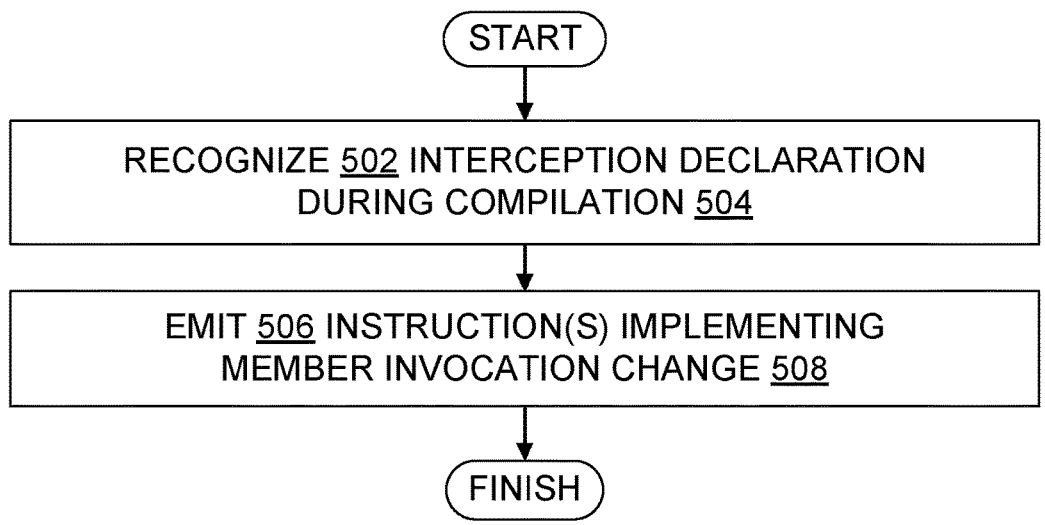
FIG. 4 is a block diagram illustrating some additional aspects of member invocation declarative interception functionality.
FIG. 5 is a flowchart illustrating steps in some member invocation declarative interception support processes.

FIG. 4 shows some additional aspects of some enhanced systems 202. This is not a comprehensive summary of all additional aspects of enhanced systems 202 or all aspects of member invocation declarative interception functionality 204. FIG. 4 items are discussed at various points herein, and additional details regarding them are provided in the discussion of a List of Reference Numerals later in this disclosure document.

Figure 6:
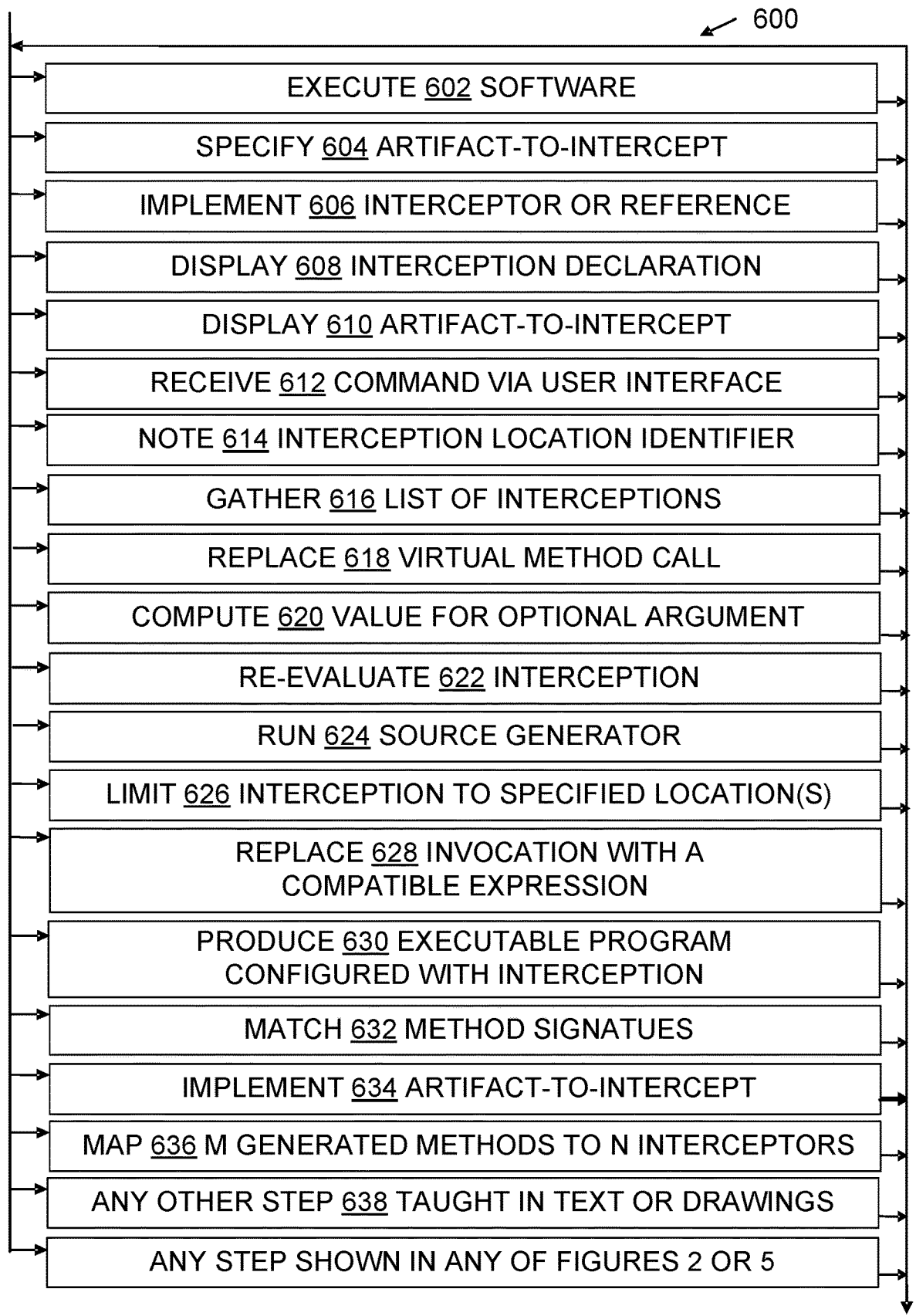
FIG. 6 is a flowchart further illustrating steps in some member invocation declarative interception processes, and incorporating FIG. 5.

The other figures are also relevant to systems 202. In particular, FIGS. 5 and 6 illustrate processes of system 202 operation.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a computing system 202 which includes: a digital memory 112 and a processor set 110 including at least one processor, the processor set in operable communication with the digital memory. The system, which is configured to support member invocation declarative interception 212, also includes a compiler 122 which upon execution by the processor set performs a compilation 504 of a source code 134. The source code contains a declaration 214 of an interception 212 by an interceptor 218 of an artifact-to-intercept 304. The source code also specifies 604 the artifact-to-intercept. The artifact-to-intercept has a non-intercepted invocation 306, 210. During the compilation the compiler emits 506 an instruction 116 implementing 606 an invocation change 508 within an invocation statement 444 from the non-intercepted invocation 306, 210 to an invocation 308, 210 of the interceptor 218. The compiler 122 also emits 506 an instruction 116 implementing 606 a reference 220 to the interceptor or instructions 116 implementing 606 the interceptor 218, or both. Accordingly, upon execution of the compiler 122 the system 202 configures an executable program 310 which is based on the source code 134, and execution 602 of the executable program invokes 210 the interceptor 218 in the place of invoking 210 the artifact-to-intercept 304.

In some embodiments, the source code 134 includes instructions 214 on what members should be intercepted and by what; those instructions may have been written explicitly by the developer, or they may have been generated automatically by a source code generator 438 invoked by the compiler. When the compiler is emitting 506 the output of the compilation (e.g., IL, asm, etc.), it outputs the calls but with the intercepted target. Thus, if A is to be replaced by B, instead of emitting "call A" the enhanced compiler emits 506 "call B", as if the original source code had contained a call to B. The compiler does not necessarily emit instructions about changing the invocation, e.g., it doesn't necessarily indicate in the emitted code an instruction to replace "call A" with "call InterceptA". Inspection of the resulting emitted IL/asm will show a result as if the developer had explicitly called the interceptor. In these embodiments, the only way to discern from looking at the resulting IL/asm that this interception mechanism was involved is if a) the compiler explicitly leaves breadcrumbs that it did so, such as by adding attributes in metadata, e.g. [assembly: CompilerReplaced("A", "B")], or b) by examining the code built into the assembly that includes the original interception instructions.

Some embodiments include a compiler 122 that compiles interceptions together with intercepted code. As an example, suppose a source code 134 includes a method foo( ), and also includes a declaration 214 that a call 210, 448 to foo( ) should be intercepted so that bar( ) is called instead. In this example, bar( ) is an interceptor 218, and foo( ) is an artifact-to-intercept 304. The address 432 of the code for foo( ) is a non-intercepted address, the address 432 of bar( ) is the address of the interceptor, and an access statement 444 is the call to foo( ).

In some cases, the compiled code will contain the code for foo( ) will contain the code for bar( ), and will contain code for the call to foo( ) modified to be a call to bar( ) instead. In some cases, the method foo( ) is implemented in a library 446 that is referenced by the current program. In some cases, the method foo( ) is present in already compiled binary form on a machine 101 where the compilation 504 takes place; the source code of method foo( ) is not necessarily present on the machine where the compilation takes place. Similarly, bar( ) can be implemented in a library 446 as well.

In some embodiments, only methods 404 are interceptable, whereas in other embodiments other members 208 are also be interceptable via a declaration 214 and an enhanced compiler. In some embodiments, the artifact-to-intercept 304 includes at least one of the following: a method 404, a field 422 of a data structure 424, a property 428 of an object 426, or a member 208 of an object 426.

In at least some embodiments, however, the artifact-to-intercept 304 excludes any exception vector table, because the compiler does not have access to vector tables. In some embodiment, the artifact-to-intercept 304 excludes any of the following, due to the lack of available information, the complexity of checking compatibility of a replacement artifact 218, or both: an exception, an exception try block, an exception catch block, or an exception handler; a compound statement; a statement labeled with a go to statement jump label; an interrupt handler; or a vector in a vector table.

In some embodiments, invocation 210 addresses 432 can be changed by interception. In some, the non-intercepted invocation 306 includes at least one of the following: a subroutine 430 address 432, a base address 434 of a data structure 424, or an offset address 436 into a data structure 436. A method is an example of a subroutine 430; some other examples include coroutines and handlers. Depending on the embodiment and the particular declaration 214, interception may accordingly produce a change 508 wherein program 310 execution 602 does one or more of the following: (a) accesses (reads or writes) a subroutine X instead of doing an originally programmed access to a subroutine Y, (b) accesses an object or other data structure at a base address A instead of doing an originally programmed access to another object or data structure at a base address B, (c) accesses a field FR at an offset address R of a data structure instead of an originally programmed access to a field FS at an offset address S of that data structure. Moreover, depending on the embodiment and the declaration 214, interception 212 may replace an access to a field 422 by an access to a subroutine 430, or vice versa. In some embodiments, the interception replaces invocation of one target 208 with invocation of a different target 208 of compatible signature (e.g., by replacing a memory address for a method call).

Some embodiments use an IDE, stand-alone source code editor, or other development tool to let a developer check declarations 214. In some embodiments, a developer is able to right-click on an intercepted method 404, 304, select "go to definition" or an equivalent, and be shown the intercepting method 404, 218 instead of, or together with, any original definition of the method. Some embodiments display intercepted methods differently, such as in a different color from the normal color used for method calls, and some display adornments or icons next to lines that have intercepted calls. Some embodiments receive a method 404 selection and in response enumerate all the related interception declarations 214, intercepted (or other) call sites 408, and interception location identifiers 314.

In some embodiments, interceptions are not constrained to the interception of method calls. For example, consider this C# code:

Action a=Foo;
Bar(a);
. . .
static void Bar(Action a)=>a( );

This code creates a delegate (a function pointer) to the method Foo, and passes that Action delegate. When Action is later invoked, the original method Foo will be invoked. In some embodiments, this is interceptable such that if a developer has a method Zoo that is an interceptor of Foo, this example code will be compiled as if it were written:

Action a=Zoo;
Bar(a);

Some embodiments include a software development tool 124 having a user interface 130, and upon execution by the processor set 110 the user interface displays 608 the declaration 214 of the interception and also displays 610 the source code specification of the artifact-to-intercept 304.

In some embodiments, an interception declaration and interceptor are created by a source generator 438. Some embodiments include a source generator 438, and the declaration 214 of the interception is an output of the source generator.

Other system embodiments are also described herein, either directly or derivable as system versions of described processes or configured media, duly informed by the extensive discussion herein of computing hardware.

Although specific member invocation declarative interception architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of member invocation declarative interception functionality, for example, as well as different technical features, aspects, mechanisms, software, expressions, operational sequences, data structures, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5 and 6 each illustrate a family of processes 500 and 600 respectively, which are performed or assisted by some enhanced systems, such as some systems 202 or another member invocation declarative interception enhanced system as taught herein. Process family 500 is a proper subset of process family 600.

FIGS. 1 to 4 illustrate member invocation declarative interception system 202 architectures with implicit or explicit actions, e.g., parsing source code to identify a declaration 214, creating or accessing internal compiler data structures such as abstract syntax trees, symbol tables, and intermediate representations, lexical analysis, static analysis, and other compilation 504 activities which do not necessarily involve invocation interception, or otherwise processing data 118, in which the data 118 includes, e.g., source code 134, location identifiers 314, optional arguments 316, and virtual methods 322, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in source code 134. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 6. FIG. 6 is a supplement to the textual examples of embodiments provided herein and the textual descriptions of embodiments provided herein. In the event of any alleged inconsistency, lack of clarity, or excessive breadth due to an aspect or interpretation of FIG. 6, the text of this disclosure shall prevail over that aspect or interpretation of FIG. 6.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 6 to be non-operable, the sequence S is not within the scope of any claim. Any assertion otherwise is contrary to the present disclosure.

Some embodiments provide or utilize a process 600 performed by computing system 202 to support member invocation declarative interception. The process includes recognizing 502 in a source code a declaration 214 of an interception by an interceptor of an artifact-to-intercept, the source code also specifying 604 the artifact-to-intercept, the artifact-to-intercept having a non-intercepted member invocation; during a compilation 504 of the source code emitting 506 an instruction which implements a member invocation change 508 within an invocation statement from the non-intercepted member invocation to an invocation of the interceptor; wherein the process produces 630 an executable program which is based on the source code and is configured to invoke the interceptor in the place of invoking the artifact-to-intercept.

In some embodiments, an interception has a location identifier 314. Some examples of an interception location identifier are:

[InterceptsLocation("Program.cs", startLine: 20, endLine: 31)]//block of code

[InterceptsLocation(CallSite("Program.cs", 35)]//35th call site down from the top of Program.cs

[InterceptsLocation(CallSite(3248)]//3248th call site within the executable

[InterceptsLocation(CallSite("mySite")]//call site labeled in executable as "mySite"

In some embodiments, the process 600 includes noting 614 an interception location identifier in the declaration of the interception. Then the emitted 506 instructions are tailored to match the identified location 312.

Some embodiments precompute a list of intercepted artifacts for more efficient compilation. In some embodiments, the process 600 includes gathering 616 a list of interceptions prior to emitting 506 instructions which implement the listed interceptions.

In some embodiments, the process 600 includes emitting 506 during compilation instructions configured to intercept a virtual method 322 call 448 by replacing 212 it with non-virtual static method 320 call 448.

In some embodiments, the interceptor 218 includes a method having an optional argument 316. In some embodiments, the optional argument is not present on the item being intercepted, and is instead filled in by the compiler with extra information about the item that is being intercepted, such as source code location.

In some embodiments, the process 600 includes reevaluating 622 an interception after receiving 612 an edit 406 to the source code during a debugging session 442. In some cases, an interception interacts with debugging 440, e.g., by changing an interceptor 218 during edit-and-continue debugging. Accordingly, in some embodiments re-evaluation 622 includes re-running 602 source generators 438.

In some embodiments, the interceptor includes a static interceptor method, the artifact-to-intercept includes an artifact-to-intercept method, and a signature 416 of the static interceptor method matches 632 a signature 416 of the artifact-to-intercept method. In some, for example, a static method is checked 632 to confirm it has a signature that matches the method being intercepted.

In some embodiments, interception is limited 626 to a method call at a specified location. The code 134 and compiler 122 limit the call sites where the intercept occurs by including an [InterceptsLocation] attribute or similar indicator 314. Such an indicator 314 can specify a file path and optionally line, column ranges. The compiler will then only intercept calls that occur in that location. IN some embodiments, [InterceptsLocation] or another interception location identifier 314 is associated with an interceptor 218 not with an interceptee 304, in that a given interceptor is used only if the call site matches the location 312 in the identifier In some embodiments, the artifact-to-intercept includes a method, the process 600 intercepts a first method call site 408 of the method at a first method call site location 312, and the process 600 avoids 626 intercepting a second call site 408 of the method at a second method call site 408 location, thereby limiting 626 interception 212 of the method based on the method call site locations 312.

In some embodiments, the process 600 includes at least one of: emitting 506 instructions implementing 606 the interceptor, or emitting 506 instructions implementing the artifact-to-intercept.

Some embodiments map M interceptors to N artifacts-to-intercept. In particular, this allows M source generator-produced methods to intercept N developer-written methods. In some embodiments, the process 600 includes emitting 506 instructions which map 636 M interceptors to N artifacts-to-intercept, M and N each an integer greater than 1. This mapping capability provides significant flexibility. For instance, a get-data method 304 may be mapped to a public cloud get data method for some calls, be mapped to a local network get data method for some other calls, and be mapped to a default value for the remaining calls, and a set-data method may likewise be mapped to public cloud, local network, or default value versions.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as user interface 130 instructions 116, compiler 122 instructions 116 and data structures 424, interception declarations 214 in source code 134, interception location identifiers 314 in source code 134, and interception lists 318, in the form of data 118 and instructions 116, read from a removable storage medium 114 and/or another source such as a network connection, to form a configured storage medium. The configured storage medium 112 is capable of causing a computer system 202 to perform technical process steps for providing or utilizing member invocation declarative interception functionality 204, as disclosed herein. The Figures thus help illustrate configured storage media embodiments and process (a.k.a. method) embodiments, as well as system and process embodiments. In particular, any of the process steps illustrated in FIG. 5 or 6, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a process 600 to support member invocation declarative interception. This process includes recognizing 502 in a source code a declaration of an interception 212 by an interceptor 218 of an artifact-to-intercept 304, the source code also specifying 604 the artifact-to-intercept, the artifact-to-intercept having a non-intercepted address 432; during a compilation 504 of the source code emitting 506 an instruction which implements an address change 508 within an access statement 452 from the non-intercepted address 432 to an address 432 of the interceptor; wherein the process 600 produces 630 an executable program 310 which is based on the source code and is configured to access 450 the interceptor in the place of accessing 450 the artifact-to-intercept.

In some embodiments, the process 600 includes emitting 506 instructions implementing 216 the interceptor, and emitting 506 instructions implementing 634 the artifact-to-intercept.

In some embodiments, the process 600 includes computing 620 an argument value 454 for an optional argument 316 of the interceptor.

In some embodiments, the declaration 214 occurs in an attribute 418.

In some embodiments, the process 600 replaces 628 an invocation of a member with a compatible expression 402, namely, an expression which is equivalent in type 414 to the method 404 and for which all unbound variables 410 in the compatible expression are equal in name 412 and type 414 to unbound variables 410 in the replaced invocation 210.

Additional Observations

Additional support for the discussion of member invocation declarative interception functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide a mechanism by which a program can declaratively intercept method calls and their arguments from other parts of the program. Other ways for doing this rely on mechanisms outside of the program. With functionality 204, a program can rewrite itself to intercept calls. This solves problems that are discussed herein, e.g., impositions on developer involvement, avoidance of reliance on JIT compilation, surreptitious changes to program behavior at runtime, and limitation of conventional source generators to mere augmentation of program source code.

In some embodiments, a "memory access target" can be, e.g., a method, a property, a field, or a member of an object (these examples overlap in some programming languages). A method is a memory access target that is distinguished from other methods by an address in a call statement; if method A and method B have the same signature, then a call to method A can be changed into a call to method B by changing the address in a call statement from the address of method A to the address of method B. A field is a memory access target that is distinguished from other fields by an address (e.g., base and offset) in a memory read or write statement (the base may be implicit or set in another statement); if field A and field B have the same data type (integer, string, etc.), then a read or write to field A can be changed into a read or write to field B by changing the address in a memory read or write statement from the address of field A to the address of field B.

In some embodiments, an interceptor 218 and its interceptee 304 may differ as to data type. For example, consider two types A and B, in which B derives from A:
 class A { }
 class B: A { } then code could have a field typed as A:
 private A_value;
and for reads, it could be intercepted by a field of type B:
 private B_value;

This works because every B is an A. This only works for reads, but the inverse would work for writes. Similarly, different embodiments have different tolerances for additional code to be injected to handle smoothing over differences or increasing the scope of what is treated as compatible. In some scenarios and some embodiments, a 32-bit integer field (Int32) and a 64-bit integer field (Int64) are compatible such that one is allowed to intercept the other, with appropriate casts inserted by the compiler.

In some embodiments, if the interceptor is defined to apply to a given member access based on [InterceptsLocation] or other criteria, the embodiment proceeds with binding as though the interceptor is the member that was chosen, not the intercepted member. The compiler or code emitted by the compiler performs conversions according to the member kind (e.g., property, method, field), and related information such as the return type and parameter types. If the replacement does not result in successful compilation, the compiler reports appropriate errors for why the intercepted member usage is invalid, including in some embodiments an indicator that the errors occurred after interception. An example error is along the lines of "InterceptedThing( ) is a field of type int, which cannot be invoked", when the original InterceptedThing was a method with an appropriate signature until interception occurred and replaced it with something invalid.

Some embodiments include enhancements which allow a program to declaratively intercept method calls and all their arguments from other parts of the program. For example, a source code may include a declaration to a suitably enhanced compiler, such as
 [Intercepts(typeof(Job), "Submit")]
 static void InterceptSubmit(string args) { }

This declaration means that all calls to Job.Submit within the program will be routed through this InterceptSubmit method instead of Job.Submit. This functionality allows declarative interception of calls within the program, meaning that the interception is declared in source code prior to a compilation, as opposed to relying on an interception performed at runtime without any warning given first in the source code. Moreover, in some embodiments no annotation, opt in or acknowledgement of the interception is necessary at the call site.

In some embodiments, these interceptions can be fine grained. A default in some embodiments is to intercept all calls within the program, but interception can be limited instead to all calls 448 within a specific file 456, a specific line range in a file 456, or a specific call site 408 in a file, or a combination thereof. This declarative interception, without requiring call site interception, allows for additional external generator 438 scenarios. A source generator 438 can now modify program behavior without modifying the code 134 the user wrote. This technology allows the program to rewrite itself to intercept these calls. There is no external process or technology required beyond the functionality 204. The target program can effectively modify the calls it makes declaratively.

Specifically, functionality 204 enables code generators 438 to proactively automatically modify programs without modifying the code that users wrote. This solves several design time and build time problems, such as a requirement for the original program's developer's time, the original developer's continued access to the program's source code, and more complex software life cycles, especially as to design, development, testing, release, and deployment. Concretely, functionality 204 makes technologies like debugging edit and continue technology work with call site modification.

Edit and continue is a feature of some debuggers 124 that permits a developer to make changes to a program while it's being debugged; the new code the developer wrote or changed is used for the remainder of that program's execution, without needing to restart the program. In effect, the in-memory assembly code for a program is edited as it's being debugged, although the developer directs the edit by editing the higher-level language code. Some systems provide a similar hot reload capability. In some embodiments, edit and continue debugging is facilitated because interception 212 leaves line numbers unchanged. In some embodiments, intercepts are reevaluated after an edit during edit and continue debugging, to determine any updates to interception 212 by the edit.

In some embodiments, functionality 204 also allows for enhanced inspection of code. Developers of a program 310 can intercept calls to problematic APIs and inspect their arguments 454 for diagnostic purposes.

In some embodiments, functionality 204 requires no call site modification or opt in to allow the interception. The call site 408 and the interception of the call are in that sense completely separate code paths.

In some embodiments, functionality 204 supports compile time generation in scenarios which conventionally require runtime code generation. This enables greater ahead of time (AOT) compilation, with corresponding advantages such as less disruption to production environments, reduction of runtime spin-up overhead, and better code maintainability.

In some embodiments, functionality 204 enables interception over specific call sites or a range of call sites in the program. This permits a system 202 to have the advantages noted above without incurring disadvantages from undesired interceptions.

In some embodiments, functionality 204 enables domain specific compiler plugins to use knowledge of the program to intercept calls, generate more efficient code patterns, and leverage them at execution time. Such knowledge includes internal representations generation by the compiler, e.g., through static analysis, flow analysis, security vetting, and intermediate language generation. Other knowledge may also be used, e.g., in some scenarios a source generator makes a call out to a web service to look up information and uses that information to determine what code to emit.

Some embodiments have technical characteristics that distinguish them from less powerful, less flexible, or less secure approaches. Unlike macros, member invocation declarative interception is not constrained to text substitution; an interceptor need not be a textual expansion of an artifact-to-intercept. In some embodiments, the binary at an intercepted call site looks the same with or without interception 212 except for the call instruction jump target address, whereas the binary for an expanded macro looks very different as a result of the macro expansion. Moreover, macro expansion text substitution does not have access to internal representations of a program built by a compiler (e.g., IL, AST, object model), whereas a source generator or other functionality 204 mechanism does have such access because such mechanisms 204 operate during compilation after the lexical analysis phase that includes or follows macro expansion. Unlike macro expansion, member invocation declarative interception can alter different instances of an alteration target—different call sites, for instance—in different ways.

In some embodiments, functionality 204 provides an expanded form of meta-programming, with similarities to and differences from macros and some versions of aspect-oriented programming. Unlike macros, the rewrite is not syntactic, and functionality 204 also has access to semantic information from the program because source generators or the compiler or both provide semantic information. In some embodiments, functionality 204 differs from some aspect-oriented programming in that existing methods don't get modified ("weaved"). Instead, a new method is introduced and individual call sites 304, 408 in the original program are redirected 212 to source generated methods 218, 404.

In some embodiments, developer code or source generator code can analyze the program and determine what to substitute 508 for a particular call site, e.g., determine how to augment the program, and can pass location info or static analysis results or other info from a call site to an augmentation mechanism such as a source generator 438.

As an example, consider the technical problem of implementing regular expressions ("regex") as code in a program. A simple yet illustrative regex is one that matches a string "abc". That is, when given a string, code implementing the regex "abc" either returns a value indicating the location of an instance of "abc" in the string or returns a value indicating that the string does not contain "abc", depending on the string. The developer includes a line such as this in the program:

bool isMatch=Regex.IsMatch("abc", possibleMatch)

To implement the regex code, a non-enhanced source generator generates source along the following lines:

[GeneratedRegex("abc")]
static partial Regex AbcMatcher( ); . . .

However, in order to utilize the generated regex code, the developer changes the code to call it:

bool isMatch=AbcMatcher( ).IsMatch(possibleMatch)

This approach enables a source generator to provide a tailored implementation specific to the "abc" pattern, but still requires developer time and effort to modify the original program source code in order to call the generated regex code.

A better approach utilizes functionality 204 to effectively update the developer's code automatically and proactively, by rerouting the original IsMatch method to the generated one at compile time, using a declaration 214 such as the following with an enhanced compiler:

[Intercepts(typeof(Regex), "IsMatch")]
static bool SourceGeneratedIsMatch(string pattern, string input) { }

In some embodiments, interception 212 results in a significant yet very small change to a binary—which method is invoked—especially when the two methods have the same signature 416. In some embodiments, the original method 304, 404 is still compiled into the binary 310. In some, there is no need for the developer to edit the method name in the source.

In some embodiments, the file name and line number of a call is the same before and after interception 212. Accordingly, during debugging 440 a step command behaves the same after interception except that execution steps into or through the interceptor function 218 instead of the original function 304.

In some embodiments, the runtime performance impact of interception is only the impact change due to running 602 the interceptor instead of running the intercepted code.

There is some compilation overhead but it can be kept small per teachings herein such as use of attributes 418 to hold declarations 214, and interception lists 318. Interception 212 is more efficient than an alternative of throwing out compiler or other tool work on the original code if the original code is modified or overwritten by injected code.

Some embodiments utilize functionality 204 to move computational resource costs from runtime to compile time, thereby reducing startup costs with containers. In some scenarios involving a web server or other program that is implemented with containers, runtime tailoring of the program incurs costs to create a working set and obtain libraries, using just-in-time (JIT) compilation. In microservice and some other environments, however, containers are frequently started, stopped, and then restarted, e.g., several times an hour or even more frequently. Thus, the start-up costs associated with JIT compilation are incurred repeatedly. By contrast, functionality 204 moves those costs or corresponding costs to ahead-of-time (AOT) compilation time 504, so they are incurred many fewer times, perhaps even only once. Unless stated otherwise, "compilation" herein refers to ahead-of-time compilation which is prior to runtime, as opposed to JIT compilation which occurs during runtime of an executable 310 previously built by an AOT compilation.

Moreover, functionality 204 AOT compilation is more secure than JIT compilation. Indeed, some environments prohibit JIT compilation in order to enhance their security—write-execute memory pages are not permitted. But functionality 204 AOT compilation can be securely employed with code 310 that runs in such non-JIT environments. Although functionality 204 AOT compilation modifies program 310 behavior in arbitrary ways (unlike approaches that merely provide augments to existing code), functionality 204 AOT compilation is not a security hole because the override or other program behavior change functionality 204 causes is documented in the source code. The interceptor 218 and the interception declaration 214 are visible in the source code in an IDE or other tool, and the modified call or other change 508 appears in the binary compilation output as opposed to being injected transparently at runtime.

Some embodiments support interception of or by methods which have one or more optional arguments 316. Although a distinction can be made that parameters are in method signatures and arguments are in method calls, usage varies, and arguments are also referred to herein as parameters. For instance, in Foo(string? s=null) the parameter s is an optional parameter.

In some embodiments, an interception 212 involving an optional parameter 316 looks like this:
Regex r=Regex.Generated("abc");
static Regex Generated(string pattern, [OptionalFromSourceGenerator] Regex? r=null) {return r;}
Regex r=Regex.Generated("abc", new ABCSourceGenerated( ));

In this example code, the first two lines are part of the original program, and the compiler is effectively replacing the first line with the third line.

In some embodiments, compiler-internal object models representing aspects of a program that is being compiled are changeable by a source generator. In effect, such a source generator has write-access to internal representations that are typically only writable by the compiler. However, allowing the source generator to modify compiler-internal data structures degrades compiler performance by causing reevaluations involving potentially modified or actually modified internal data structures such as the object model.

In some embodiments, similar but distinct intercepted artifacts 304 correspond to an interceptor 218 containing a switch statement. For example,
bool IsMatch=Regex.IsMatch1("abc", possibleMatch)
bool IsMatch=Regex.IsMatch2("def", possibleMatch)
correspond to an interceptor 218 containing a switch statement:
static bool SourceGeneratedMatch(string pattern, string input) {
  switch (pattern) {
    case "abc": . . .
    case "def": . . .
  }
}

However, the switch statement adds runtime overhead. Some embodiments support a more runtime-efficient approach which labels the call sites with respective location attribute values, such as:
[InterceptsLocation("c:\file\path\my1.cs", 247)]
[InterceptsLocation("c:\file\path\my2.cs", 16)]
Then the system 202 generates respective methods such as SourceGeneratedMatchabc( ), SourceGeneratedMatchdef( ), etc; More generally, some embodiments map 636 M generated methods to N call sites.

Some embodiments provide or utilize improvements to generator 438 flexibility. Some embodiments provide a set of features such that generators in can move code which conventionally requires reflection to source code in a user application.

As an example scenario, in some environments route handling maps raw query strings to delegates which handle the requests. This involves parsing the query string, mapping query elements to parameters and coercing types from strings to the corresponding parameter type. In one approach, the code to do this is generated at runtime and dispatched via reflection. However, information available at compile time can be used to generate the handler parsing and dispatch. With some embodiments of functionality 204, a mechanism is provided for hooking up these calls as well as efficient ways to emit them from generators.

In some embodiments, an enhanced compiler will intercept method calls in the code. This allows for a number of features including simplified logging, debugging and method specialization. The latter is useful to source generators to generate specific code for a call site, as an alternative to a mutating generator with its attendant problems to the ecosystem and toolset. Call site specialization via functionality 204 does not present those problems.

In order to intercept a call, in some embodiments the code will provide a static method which has a signature that matches 632 the method being intercepted. Binding uses the original method 304. Signature matches are assessed as with overrides. In the case of an instance method being intercepted the "this" parameter is provided as the first argument, as an extension method would do.

In some embodiments, the code is decorated with a new attribute: InterceptsAttribute. This attribute takes the type being intercepted and the name of the method.

In some embodiments, the compiler 122 will determine the signature of the method being intercepted by examining the signature of the method where InterceptsAttribute is applied. The isStatic parameter is used to determine if the first parameter is or isn't part of the signature.

For example, assume the compiler is given this declaration 214:
[Intercepts(typeof(EndpointRouteBuilderExtensions),
"MapGet", isStatic: true)] static IEndpointConvention-
Builder InterceptMapGet(
IEndpointRouteBuilder endpoints,
string pattern,
RequestDelegate requestDelegate)
{
...
}

Then the compiler will intercept all calls to MapGet in the application and route them to InterceptMapGet instead.

In some embodiments, the code can limit the call sites where the intercept occurs by adding the [InterceptsLocation] attribute. This can specify a file path and optionally line, column ranges. The compiler 122 will then only intercept calls that occur in that location. The InterceptsLoctionAttribute can occur multiple times on a method and the intercept will occur for any that match.

For example, to limit the intercepts of InterceptMapGet to Program.cs from lines 20 to 30, the code would add:
[InterceptsLocation("Program.cs", startLine: 20, endLine: 31)]

The path may be relative, or fully-qualified, depending on the embodiment.

In some embodiments, a method call cannot be intercepted inside a [Intercepts] method for that method (or any local function or lambda inside it). That could lead to unbounded recursion.

In some embodiments, a method can be intercepted multiple times but a call site can only map to a single intercept. If a call site maps to multiple intercept methods that is an error.

In some embodiments, an intercepted method can be intercepted (interception-ception).

In some embodiments, the file path provided to InterceptsLocation is subject to /pathmap rewriting when binding and emitting to metadata.

In some embodiments, if an [Intercepts] method cannot be bound to a method at compile time based on the information provided, then it is a compilation error.

In some embodiments, state from the call site can be passed to the intercept method 218. In some, the interceptor 218 can capture values via an extra parameter.

In some embodiments, one or more of the following limits are placed on interception: (a) the interceptor method 218 and the method 304 being intercepted must have the same signature, (b) the interceptor method 218 and the method 304 being intercepted must have the same signature except with regard to a "this" parameter, (c) the interceptor method 218 and the method 304 being intercepted must have the same signature except with regard to an optional argument, (d) the interceptor 218 and the artifact 304 being intercepted must be the same kind of artifact, e.g., both are methods, or both are fields, or (e) the artifact 304 being intercepted must expressly permit interception, e.g., via an [Interceptable] attribute.

Under an alternate approach involving optional arguments, method calls that require extra compile time code C provide an overload that accepted code C as an argument. For example, in this approach MapGet adds a parameter for the delegate that does all of the query string to argument handling. This is then be marked as optional code that is meant to be provided by a generator 438:

static IEndpointConventionBuilder MapGet(
IEndpointRouteBuilder endpoints,
string pattern,
RequestDelegate requestDelegate,
[GeneratorProvided] HandlerDelegate handler)
{
...
}

Code then provides values for these optional parameters by defining methods, similar to [Intercepts], that are used to create the value:
[Provides(typeof(EndpointRouteBuilderExtensions),
"MapGet")]
static HandlerDelegate CreateOptionalParameter( )
{
...
}

The compiler then uses these methods to fill in the optional handler parameter at MapGet call sites. This approach has many of the same tradeoffs as the intercepted 2121 method design presented herein as functionality 204, but functionality 204 using intercept declarations 214 in the manner described elsewhere herein satisfies more scenarios and is therefore currently preferred.

Another alternative involves mutating generators, namely, source generators which mutate the call site directly. This provides all the capabilities of method interception, and more. However, this mutating generator approach has substantial negatives associated with it.

One negative is that putting limits on a mutating generator is very difficult. Even a well-meaning mutating generator could inadvertently, but meaningfully, alter the behavior of code it touched. This could lead to loss of developer confidence in an ecosystem as generators could be perceived as altering the intent of what developers wrote. By contrast, conventional generators simply augment and the program is fully described by the totality of the outputted code.

A second negative is that mutating generators pose a significant set of engineering challenges. Generator state would be carried somehow from the initial compilation phase to the IDE. Mutating generators also pose significant challenges for debugging, edit and continue, and how an IDE displays code (e.g., how to expose a mutation), etc.

Some embodiments use or provide generator API support. In some, the intercept declaration 214 can be coded by hand. However, one use case contemplated herein is that source generators will proactively automate method interception. Accordingly, some embodiments provide efficient APIs to let generators 438 find call sites for mapping.

Some cases for this feature revolve around the generator focusing on a limited set of names. As such, in some embodiments the compiler will provide the following method:
public
IncrementalValuesProvider<T>ForMethodInvocation
WithName<T>(string methodName,
Func<SyntaxNode, CancellationToken,
bool>predicate,
Func<GeneratorAttributeSyntaxContext, CancellationToken, T>transform)

This will have the same efficiencies the compiler provided in methods like ForAttributeWithShortName and ForAttributeWithMetadataName. It will significantly reduce the CPU time spent in these paths for IDE scenarios.

Some embodiments include an overload which allows for a full method signature to be specified, or specify the argument count. This allows an embodiment to leverage additional caching.

Some embodiments include an overload for static methods. That allows significant caching benefits.

In some embodiments, source code includes a declaration 214 such as [Intercepts(typeof(Job), "Submit")] static void InterceptSubmit(string args) { . . . } . . . . This declaration 214 is written in source code that's compiled into the same compilation unit or program as the method being intercepted. While it could be written manually by a developer in some embodiments, a significant use case for the capability 204 is for a source generator to emit this code 214.

As an example, suppose the application had the code:
File1.cs:
. . .
Console.WriteLine("Hello");
A source generator 438 that is hooked into the compiler 122 emits 624 the following into a File2.cs that's compiled into the same compilation:
File2.cs:
. . .
[Intercepts(typeof(Console), "WriteLine")]
static void WriteLineWithAdornments(string text)
{
　Console. Write("***"),
　Console.Write(text),
　Console.WriteLine("***"),
}
Then when the compiler emits the code for Console.WriteLine("Hello"), it would actually emit 506 a call to:
WriteLineWithAdornments("Hello");
such that rather than just printing out:
"Hello"
it would instead print out:
"*Hello*"

In some embodiments, the compiler is enhanced so that the compiler includes method interception code in the binary compiled code. As in the example above, when the compiler emits the method call for the Console.WriteLine, it instead emits a call to the WriteLineWithAdornments method. The resulting binary will contain the call to the latter rather than the former.

This technology 204 allows the program to rewrite itself to intercept these calls. There is no external process or technology required. The program can effectively modify the calls it makes declaratively. This is because the enhanced compiler places method interception code in compiled code as part of the binary executable. It's the program itself (source code in the program) that's causing the method to be intercepted. There's no external entity that's rewriting the program; rather, some source code 134 in the program dictates that calls to method A in that same program should be replaced by calls to method B. That source code might be injected into the program via a source generator, but all of the source generated by a source generator is logically considered to be part of that program, and is inspectable as part of the program, e.g., in an IDE.

In some embodiments, the methods are intercepted at compile time, such that calls in the source to method A are emitted into the binary as instead being calls to method B. The calls to method A no longer exist in the binary at all, nor does any mechanism for interception of method calls; such interception is done entirely at compile time. The resulting binary looks just as if the original source code had used calls to method B instead of calls to method A.

It is contemplated that in some (perhaps many) situations, some (maybe many, or even all) of the methods in a given compiled program will not be intercepted. The only ones that are intercepted are calls to method A in the source being compiled where that source being compiled also includes an interception declaration 214, e.g., a method attributed in the source code as [Intercepts(typeof( . . . ), "A")].

As to binary storage efficiency, a purely hypothetical binary code size increase due to the interception code is not an actual factor because the binary resulting from interception looks as if the original source code had used calls to method B instead of calls to method A.

As to compilation efficiency, compilation time spent generating the interception code can be minimized, e.g., by action of the compiler to discover all of the intercepts. In order to enhance a compiler so that the compiler inserts declarative method call interception code into binaries as part of compilation, an experienced compiler author can implement a mechanism for expressing the declaration 214 in the source code of the language being compiled (e.g., the [Intercepts( . . . )] attribute), define the semantics for that interception (e.g., extent of variation allowed by signature matching 632 or cross-kind interceptions such as fields intercepted by properties), and incorporate that semantics into an intermediate representation employed by the compiler to represent the source being compiled, and emit 506 the rewritten code according to the interception specified.

In some embodiments, the feature 204 was designed with particular attention to how the compiler discovers all the intercepts, in order to avoid computationally expensive discovery. For instance, the annotations 214, 314 are specified via attribute 418, allowing each intercepted method to be known statically by the compiler and the IDE when a method is being intercepted. A computationally expensive alternative occurs when the list of methods open for interception is not known ahead of time. In particular, by knowing the name of the methods being intercepted, the compiler can do a simple "string contains" check to look for the method name and rule out the vast majority of methods without actually doing deep semantic analysis (called "binding" in compiler terminology). Without the ahead-of-time specification of intercepts, or if most methods in the program were intercepted, the overhead of this feature could increase compile times by up to 2×, essentially forcing the compiler to compile everything twice. In some embodiments, an intercepted method can be intercepted (interception-ception). In the example above where WriteLineWithAdornments intercepts Console.WriteLine, it interception-ception occurs when another method [Intercept(typeof(MyMethods), "Write LineWithAdornments")] static void ActualReplacement(string text) is written, such that instead of emitting 506 calls to WriteLineWithAdornments, the enhanced compiler 122 emits 506 calls to ActualReplacement. That is, for Console.WriteLine("hello"), the compiler would emit a call to ActualReplacement("hello"), because WriteLineWithAdornments replaced WriteLine via interception and then ActualReplacement replaced WriteLineWithAdornments via interception.

One of skill recognizes that a method call does not necessarily target a fixed memory code address. A method can have no code address (e.g., virtual method), one code address (the most typical kind of method in many programs), or many code addresses (e.g., overrides of a virtual method). In some embodiments, interception is employed to intercept a virtual method call by replacing it with non-virtual static method call. In some embodiments, interception changes the mechanism of how the method call is performed; it is not always a mere replacement of one code address with a different code address. The signatures of method A and method B are not the same in such a case. The original method takes a "this" pointer as an implicit argument, and the interceptor takes the same argument as an explicit argument. This is possible because the interception happens in the compiler on program representation before method codes and method calls are assigned memory code addresses.

In some embodiments, a member access is a generalization of method access. Some embodiments perform expression replacement. In the semantics of C# and Visual Basic languages, an example of an expression replacement is a replacement of an existing method invocation expression with a new method invocation expression. Some embodiments replace a method invocation with another compatible expression 402, where "compatible" means equivalent in type and having equal sets of free variables (meaning that all unbound variables in the replacement expression are equal in name and type to unbound variables in the original expression).

Some embodiments involve human-computer interaction in an IDE 124. In some embodiments, a developer is able to right-click on an intercepted method, select "go to definition" or an equivalent, and be navigated to the intercepting method rather than to any original definition there may have been for the method. In some embodiments, a source generator 438 runs as part of the development experience (e.g., design-time builds), and the IDE consults the compiler 122 for information about the actual target to navigate to, enabling the compiler's knowledge of the interception to feed the IDE the right target information.

In some embodiments, a method is permitted to have optional arguments 316 that will be filled in by the source generator 438, e.g., Foo([FilledInBySourceGenerator] Something s=null), rather than the compiler changing the target of the invocation. In some embodiments, optional argument usage results in an artifact having a compatible signature with respect to another artifact even though the two artifacts do not have identical signatures, due to having a different number of arguments. For instance, a method Foo( ) is compatible with a method Bar([CallerLineNumber] int lineNumber=0), where this lineNumber is an optional argument that can be filled in by the compiler, and thus a call to Foo could be substituted with Bar, since the call to Bar can be made with no developer-supplied arguments, and then the compiler can fill in the optional argument (in this case, by substituting the line number at which the call appears). In some embodiments, there are one or more optional parameters 316, and the actual arguments 454 passed to those parameters are supplied by the compiler when the developer hasn't supplied them in the source, e.g., via a default value. The compiler computes 620 an argument for an optional value, e.g. by filling in the argument based on the file name, the line number, the text of an expression passed as another argument, etc.

Technical Character

The technical character of embodiments described herein will be apparent to one of ordinary skill in the art, and will also be apparent in several ways to a wide range of attentive readers. Some embodiments address technical activities such as lexically analyzing and parsing source code 134 to locate an interception declaration 214, lexically analyzing and parsing source code 134 to locate an interception location identifier 314, emitting 506 instructions 116 from a compiler 122 during a compilation 504, running 624 a source generator 438 which proactively and automatically generates source code 134 that modifies program 310 behavior via interception of an artifact-to-intercept without relying on edits 406 directed by a human developer of the artifact-to-intercept 304, and a compiler 122 automatically and proactively gathering 616 a list 318 of interceptions by lexically analyzing and parsing source code, which are each an activity deeply rooted in computing technology. Some of the technical mechanisms discussed include, e.g., compilers 122, IDEs 124, user interfaces 130, interception declarations 214 and associated compiler functionality 204, interception location identifiers 314 and associated compiler functionality 204, and optional parameters 316 and associated compiler functionality 204. Some of the technical effects discussed include, e.g., program 310 behavior modifications which are documented in source code 134 of the program and which replace an invocation 210 of one member 208 by an invocation of a different member during compilation 504 instead of making a method replacement at runtime that is not evident in the source code of the program, movement in a software lifecycle of program behavior changes 508 from runtime to AOT compile time, M-to-N mappings 636 of interceptors 218 to artifacts-to-intercept 304, different interceptions 212 at different call sites 408 of the same method based on the location 312 of each call site, and other enhancements of compiler 122 technology. Thus, purely mental processes and activities limited to pen-and-paper are clearly excluded. Other advantages based on the technical characteristics of the teachings will also be apparent to one of skill from the description provided.

Compilation 504 is a technical activity which produces a lower-level software code from a higher-level software code, where "lower" means closer to a hardware architecture in terms of generality, portability, and/or executability on hardware which has that architecture. For example, a higher-level code such as a source code written in C#, PHP, or Python is compiled to produce a lower-level code such as an assembly language code, intermediate language code, p-code, or some binary code such as an executable code. One of skill understands that software will not execute until it has been compiled (although distinctions can be made, for the purpose of whether an activity or item qualifies as part of computing technology, interpreters are a particular kind of compiler). Software such as source code input to a compiler, software production by other software such as a compiler production of intermediate language code or binary code, and software execution of compiler-produced code, are each a part of computing technology. Hence, compilers are part of computing technology, and the improvements to compilers 122 described herein are improvements to computing technology.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as a compiler 122, a standalone source code editing tool 124, a source generator 438, or an integrated development environment 124.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically modify program behavior without relying on JIT compilation or on source code edits by a developer of the program, how to support arbitrary changes to program behavior but require documentation of those changes in source code in order to prevent a security hole, and how to modify different invocations of a single method in different ways. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
AST: abstract syntax tree
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
IDE: integrated development environment
IL: intermediate language
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Member invocation declarative interception operations such as parsing and analyzing code to create compiler-internal data structure 424 representations of a program 310 for subsequent use in code generation 506, emitting 506 instructions which implement an invocation interception 212, computing 620 a value for an optional argument, running 624 source generator software 438, and many other operations discussed herein, are understood to be inherently digital. A human mind cannot interface directly with a CPU or other processor, or with RAM or other digital storage, to read and write the necessary data to perform the member invocation declarative interception steps 600 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, calling, changing, compiling, declaring, displaying, emitting, executing, gathering, generating, implementing, intercepting, invoking, limiting, mapping, matching, noting, producing, receiving, recognizing, replacing, running, specifying (and accesses, accessed, calls, called, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
101 machine in a system 102, e.g., any device having at least a processor 110 and a memory 112 and also having a distinct identifier such as an IP address or a MAC (media access control) address; may be a physical machine or be a virtual machine implemented on physical hardware
102 computer system, also referred to as a "computational system" or "computing system", and when in a network may be referred to as a "node"
104 users, e.g., user of an enhanced system 202
106 peripheral device 108 network generally, including, e.g., LANs, WANs, software-defined networks, clouds, and other wired or wireless networks
110 processor or set of processors; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102; data structures, values, source code, and other examples are discussed herein
120 kernel(s), e.g., operating system(s), BIOS, UEFI, device drivers
122 compiler tool or compilation service; services are an example of tools
124 tool in a computing system, e.g., software development tool, security tool, communication tool, etc.; computational and hence non-human
126 display screens, also referred to as "displays"
128 computing hardware not otherwise associated with a reference number 106, 108, 110, 112, 114
130 user interface; computational
132 artifact in a computing system; digital or computational or both
134 source code as represented in a computing system 102
136 cloud, also referred to as cloud environment or cloud computing environment
202 enhanced computing system, i.e., system 102 enhanced with member invocation declarative interception functionality as taught herein
204 member invocation declarative interception functionality, e.g., software or specialized hardware which performs or is configured to perform steps 502 and 506, or step 608, or step 614, or step 622, or step 626, or step 636, or any software or hardware which performs or is configured to perform a novel method 600 or a computational member invocation declarative interception activity first disclosed herein
206 support functionality 204, e.g., by performing supporting computational steps such as analyzing or parsing source code to locate an interception declaration 214, reading or writing source code files with an interception declaration 214, detecting syntax or semantic errors in an interception declaration 214, or performing any step identified in FIG. 5 or FIG. 6
208 member, e.g., method 404, field 422, property 428, or object 426 member; members are examples of artifacts 132
210 invocation or a member, e.g., call to a method, read or write access to a field, read access of a property; computational
212 interception, namely, a compile-time change from an invocation of one member to an invocation of a different member or to an invocation with different parameters (which is effectively a change to a different member if a member is viewed as a set of members parameterized by argument values); may also be referred to using terms such as replacement, substitution, or rerouting with regard to member invocation; also refers to a result of such computational activity, e.g., the interception reduced container start-up latency
214 interception declaration, namely, text in a source code 134 which declares an interception 212

216 implementation of an interceptor, e.g., source code defining an interceptor in a declaration 214; the code for the method static void WriteLineWithAdornments (string text) is an example herein 218 interceptor, namely, the member to be invoked in place of the non-intercepted artifact 304, as represented in a system 202

220 pointer to, index to, identifier of, or other reference to an interceptor; dereferencing leads to the interceptor itself, so as a practical matter discussions herein of interceptors also implicitly refer to interceptor references 304 artifact which would have been invoked 210 in the absence of any declarations 214 to the contrary; may also be referred to as artifact-to-intercept or as intercepted article 306 non-intercepted invocation, namely, an invocation which is not intercepted or which would have occurred in the absence of an interception 308 interceptor invocation, namely, an invocation results from an interception; due to interception, the interceptor invocation 308 replaces the non-intercepted invocation 306

310 executable program containing artifact-to-intercept 304; reference numeral 310 may also refer to source code 134 of that program 312 interception location, namely, location of an instance of an artifact-to-intercept within a program, as opposed to other actual or potential instances of that artifact 314 identifier of an interception location, in textual form in source code 316 optional argument or parameter of a method 404

318 list of invocation interceptions which occur in a source code (one or more files); the list is generated from source code declarations 214 but may itself be binary, e.g., a table, array, list, set or other data structure in a compiler's internal representation of a program 310

320 non-virtual method, namely, a method which is not a virtual method, as represented in a system 202

322 virtual method, as represented in a system 202; a method which is declared without an accompanying body that implements the method 324 interface generally; hardware and software 402 compatible expression, e.g., first member which upon access or other invocation returns a value that is the same or convertible to a type of a second member; the first member is a compatible expression of the second member 404 method, in the computing sense as opposed to the legal sense; may also be referred to as a routine or a procedure or a function 406 edit of a source code, as represented in a system 202

408 method call site, as represented in a system 202

410 variable, as represented in a system 202

412 variable name 414 variable data type 416 method signature, as represented in a system 202

418 attribute of a member, as stated in source code and represented in a system 202

422 field in an object 426 or other data structure, as represented in a system 202

424 data structure, as represented in a system 202

426 object, in the object-oriented programming sense, as represented in a system 202

428 property of an object 426 or other data structure, e.g., corresponding to a field but implemented as a function, as represented in a system 202

430 subroutine, as represented in a system 202

432 memory 112 address, as represented in a system 202

434 base address 432 of an object or other data structure, as represented in a system 202; often the lowest address but sometimes an object has hidden data below the base, e.g., for garbage collection 436 offset address 432 into an object or other data structure, e.g., a field 422 address, as represented in a system 202

438 source generator, e.g., a component that plugs into a compiler and adds additional code to compilation; computational; source generators 438 are expressly non-human generators of source code 440 debugging; computational activity 442 debugging session; a set of debugging activities pertaining to a particular program 310

444 invocation statement, e.g., method call, property call, read field, or write field, in a program 446 software, as represented in a system 202

448 method call 450 access to data 452 access statement to access 450 data, e.g., read or write of a field 454 argument value passed in a call 448

456 file, e.g., file in a file system containing source code 134

500 flowchart; 500 also refers to member invocation declarative interception processes that are illustrated by or consistent with the FIG. 5 flowchart 502 computationally recognize an interception declaration 214 during compilation, e.g., by lexical analysis and parsing of source code 504 computationally compile source code; one of skill recognizes that compilation is performed by software, not by people either mentally or with pen-and-paper; people manifestly lack the speed, accuracy, memory capacity, and specific processing capabilities required to perform compilation, as is evident for example in the decades of technical advances in compiler technology; a classic accomplishment in computing is to write a compiler source code for a compiler of a given programming language in that programming language and then compile that source code to produce a compiler—this is known as a self-hosting compiler, and would be pointless rather than praised if compilation was routinely done by mental processes alone 506 computationally emit instructions, e.g., lower-level code such as an assembly language code, intermediate language code, p-code, or some binary code such as an executable code 508 computationally replace one invocation by another invocation 600 flowchart; 600 also refers to member invocation declarative interception processes that are illustrated by or consistent with the FIG. 6 flowchart, which incorporates the FIG. 5 flowchart and other steps taught herein 602 computationally execute software, also referred to as running software 604 computationally specify an artifact-to-intercept, e.g., using an attribute in source code 606 computationally implement an interceptor or a reference to an interceptor, e.g., by providing a body in source code 608 computationally display an interception declaration, e.g., by configuring a user interface 610 computationally display an artifact-to-intercept, e.g., by configuring a user interface 612 computationally receive a command via a user interface 614 computationally note an interception location identifier, e.g., by parsing 616 computationally gather a list of interceptions, e.g., by scanning and parsing 618 computationally replace a virtual method call; an example of change 508

620 computationally compute a value for an optional argument 622 computationally re-evaluate an interception, e.g., after an edit 624 computationally run a source generator, e.g., proactively 626 computationally limit interception change(s) to specified locations 312, e.g., by not performing change(s) at other locations involving the same member(s)

628 computationally replace an invocation with a compatible expression 402

630 computationally produce an executable 310 by compilation 632 computationally determine whether two signatures match sufficiently to permit interception 634 computationally implement an artifact-to-implement, e.g., by emitting binary code for the body of a method 304

636 computationally map M interceptors 218 to N artifacts 304

638 any step or item discussed in the present disclosure that has not been assigned some other reference numeral; 638 may thus be shown expressly as a reference numeral for various steps or items or both, and may be added as a reference numeral (in the current disclosure or any subsequent patent application which claims priority to the current disclosure) for various steps or items or both without thereby adding new matter Conclusion In some embodiments, compilers 122 recognize 502 interception declarations 214 in source code 134, and emit 506 code 116 that replaces invocations 306, 210 of specified artifacts 304, 132 with invocations 308, 210 of specified interceptors 218 instead. Source generators 438 proactively modify 508 program 310 behavior in arbitrary desired ways without introducing hidden security violations and without requiring edits 406 by the program's developers. Interception declarations 214 are visible in source code 134 and in development tools 124 such as IDEs, editors, and debuggers. In some cases, different invocations 210 of a particular method 404, 304 at respective locations 312 are intercepted 626, 636 by different replacement methods 218. Replacement methods 218 and replaced methods 304 have identical signatures 416, or are otherwise compatible as determined 632 by the particular embodiment. Some interceptors 218 specify optional parameters 316. Method 404 calls 448, field 422 accesses 450, and property 428 calls 448 may be intercepted. Work to modify program 310 behavior is moved in the program lifecycle from runtime to compile time, thus improving runtime performance and eliminating JIT compilation security risks.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to support member invocation declarative interception, the computing system comprising:
    a digital memory;
    a processor set including at least one processor, the processor set in operable communication with the digital memory;
    a compiler which upon execution by the processor set performs a compilation of a source code, the source code containing a declaration of an interception by an interceptor of an artifact-to-intercept, the source code also specifying the artifact-to-intercept, the artifact-to-intercept having a non-intercepted invocation, and wherein during the compilation the compiler emits an instruction implementing an invocation change within an invocation statement from the non-intercepted invocation to an invocation of the interceptor, the compiler emits an instruction implementing a reference to the interceptor or instructions implementing the interceptor, or both;
    wherein upon execution of the compiler the system configures an executable program which is based on the source code, and wherein execution of the executable program invokes the interceptor in the place of invoking the artifact-to-intercept.

2. The computing system of claim 1, wherein the artifact-to-intercept includes at least one of the following:
    a method;
    a field of a data structure;
    a property of an object; or
    a member of an object.

3. The computing system of claim 1, wherein the non-intercepted invocation includes at least one of the following:
    a subroutine address;
    a base address of a data structure; or
    an offset address into a data structure.

4. The computing system of claim 1, further comprising a software development tool having a user interface, and wherein upon execution by the processor set the user interface displays the declaration of the interception and also displays the source code specifying of the artifact-to-intercept.

5. The computing system of claim 1, further comprising a source generator, and wherein the declaration of the interception is an output of the source generator.

6. A process performed by a computing system to support member invocation declarative interception, the process comprising:
- recognizing in a source code a declaration of an interception by an interceptor of an artifact-to-intercept, the source code also specifying the artifact-to-intercept, the artifact-to-intercept having a non-intercepted member invocation;
- during a compilation of the source code emitting an instruction which implements a member invocation change within an invocation statement from the non-intercepted member invocation to an invocation of the interceptor;
- wherein the process produces an executable program which is based on the source code and is configured to invoke the interceptor in the place of invoking the artifact-to-intercept.

7. The process of claim 6, further comprising noting an interception location identifier in the declaration of the interception.

8. The process of claim 6, further comprising gathering a list of interceptions prior to emitting instructions which implement the listed interceptions.

9. The process of claim 6, further comprising emitting during compilation instructions configured to intercept a virtual method call by replacing the virtual method call with a non-virtual static method call.

10. The process of claim 6, wherein the interceptor includes a method having an optional argument.

11. The process of claim 6, further comprising reevaluating an interception after receiving an edit to the source code during a debugging session.

12. The process of claim 6, wherein the interceptor includes a static interceptor method, the artifact-to-intercept includes an artifact-to-intercept method, and a signature of the static interceptor method matches a signature of the artifact-to-intercept method.

13. The process of claim 6, wherein the artifact-to-intercept includes a method, the process intercepts a first method call site of the method at a first method call site location, and the process avoids intercepting a second call site of the method at a second method call site location, thereby limiting interception of the method based on the method call site locations.

14. The process of claim 6, further comprising at least one of:
- emitting instructions implementing the interceptor; or
- emitting instructions implementing the artifact-to-intercept.

15. The process of claim 6, further comprising emitting instructions which map M interceptors to N artifacts-to-intercept, M and N each an integer greater than 1.

16. A computer-readable storage device configured with data and instructions which upon execution by a processor cause a computing system to perform a process to support member invocation declarative interception, the process comprising:
- recognizing in a source code a declaration of an interception by an interceptor of an artifact-to-intercept, the source code also specifying the artifact-to-intercept, the artifact-to-intercept having a non-intercepted address;
- during a compilation of the source code emitting an instruction which implements an address change within an access statement from the non-intercepted address to an address of the interceptor;
- wherein the process produces an executable program which is based on the source code and is configured to access the interceptor in the place of accessing the artifact-to-intercept.

17. The storage device of claim 16, wherein the process further comprises emitting instructions implementing the interceptor, and emitting instructions implementing the artifact-to-intercept.

18. The storage device of claim 16, wherein the process further comprises computing an argument value for an optional argument of the interceptor.

19. The storage device of claim 16, wherein the declaration occurs in an attribute.

20. The storage device of claim 16, wherein the process replaces an invocation of a member with a compatible expression, namely, an expression which is equivalent in type to a method and for which all unbound variables in the compatible expression are equal in name and type to unbound variables in the replaced invocation.

* * * * *